United States Patent
Hiramatsu et al.

(10) Patent No.: US 11,252,283 B2
(45) Date of Patent: Feb. 15, 2022

(54) STORAGE MEDIUM, AND METHOD AND APPARATUS FOR MANAGING PRINTING

(71) Applicant: FUJITSU LIMITED, Kawasaki (JP)

(72) Inventors: Yoshitaka Hiramatsu, Kawasaki (JP); Junki Hakamata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/798,572

(22) Filed: Feb. 24, 2020

(65) Prior Publication Data

US 2020/0280641 A1 Sep. 3, 2020

(30) Foreign Application Priority Data

Feb. 28, 2019 (JP) .............................. JP2019-035461

(51) Int. Cl.
*G06F 3/12* (2006.01)
*H04N 1/00* (2006.01)
*G06K 15/02* (2006.01)

(52) U.S. Cl.
CPC ....... *H04N 1/00206* (2013.01); *G06F 3/1206* (2013.01); *G06F 3/127* (2013.01); *H04N 1/00214* (2013.01)

(58) Field of Classification Search
None
See application file for complete search history.

(56) References Cited

U.S. PATENT DOCUMENTS

| | | | |
|---|---|---|---|
| 2002/0042263 A1* | 4/2002 | Ishikawa | G06F 3/126 455/412.1 |
| 2002/0176109 A1* | 11/2002 | Matsumoto | H04N 1/00143 358/1.15 |
| 2005/0030584 A1* | 2/2005 | Tanaka | H04N 1/00347 358/1.16 |
| 2006/0200472 A1* | 9/2006 | Nguyen | G06F 3/1236 |
| 2011/0026079 A1* | 2/2011 | Nakagawa | G06F 3/1226 358/1.15 |
| 2014/0101719 A1* | 4/2014 | Lakshminarayanan | G06F 21/6245 726/3 |

(Continued)

FOREIGN PATENT DOCUMENTS

| | | |
|---|---|---|
| JP | 2017-005510 A | 1/2017 |
| JP | 2018-128843 A | 8/2018 |
| JP | 2018-163525 A | 10/2018 |

*Primary Examiner* — Beniyam Menberu
(74) *Attorney, Agent, or Firm* — Fujitsu Patent Center (57) ABSTRACT

A computer-readable storage medium storing a program that causes a computer to execute a process, the process includes receiving a first identifier that is input when an application is used on a terminal; identifying, in accordance with the received first identifier, a storage that is associated with the first identifier and that stores file information; transmitting to the identified storage an acquisition request to acquire part or all of the file information stored in the storage; transmitting to the terminal a list of the part or all of the file information transmitted from the storage in response to the acquisition request; receiving from the terminal an item of file information selected from the list of the part or all of the file information; acquiring a file corresponding to the received item of file information from the storage; and transmitting the acquired file to a print server that performs printing processing.

8 Claims, 9 Drawing Sheets

(56) References Cited

U.S. PATENT DOCUMENTS

| | | | |
|---|---|---|---|
| 2014/0185082 A1* | 7/2014 | Yamada | G06F 3/1232 |
| | | | 358/1.14 |
| 2015/0092233 A1* | 4/2015 | Park | H04N 1/00307 |
| | | | 358/1.15 |
| 2015/0161407 A1* | 6/2015 | Hirakata | G06F 21/41 |
| | | | 726/28 |
| 2018/0227251 A1 | 8/2018 | Takishima et al. | |
| 2018/0309742 A1* | 10/2018 | Kato | G06F 16/183 |

* cited by examiner

STORAGE MEDIUM, AND METHOD AND APPARATUS FOR MANAGING PRINTING

CROSS-REFERENCE TO RELATED APPLICATION

This application is based upon and claims the benefit of priority of the prior Japanese Patent Application No. 2019-35461, filed on Feb. 28, 2019, the entire contents of which are incorporated herein by reference.

FIELD

The embodiment discussed herein is related to a storage medium, and a method and an apparatus for managing printing.

BACKGROUND

In recent years, a technology in which files are stored in cloud storage and used by, for example, a mobile device has been utilized.

As a related technology, a technology has been developed in which electronic information is obtained in accordance with a message for a print output service and a request is submitted to a kind of information technology equipment to perform print output by using the obtained electronic information.

As another related technology, a technology has been developed in which items of setting information for collection agents that run on digital multifunction devices are simultaneously distributed to image processing apparatuses.

As still another related technology, a technology has been developed in which chat data is input on a chat screen displayed on a terminal of a chat user and the chat data is then transmitted to a chatbot from the terminal of the chat user via a server for chatting. As the related art, for example, Japanese Laid-open Patent Publication Nos. 2018-128843, 2017-5510, and 2018-163525 are disclosed.

SUMMARY

According to an aspect of the embodiments, a non-transitory computer-readable storage medium storing a program that causes a computer to execute a process, the process includes receiving a first identifier that is input when an application is used on a terminal; identifying, in accordance with the received first identifier, a storage that is associated with the first identifier and that stores file information; transmitting to the Identified storage an acquisition request to acquire part or all of the file information stored in the storage; transmitting to the terminal a list of the part or all of the file information transmitted from the storage in response to the acquisition request; receiving from the terminal an item of file Information selected from the list of the part or all of the file information; acquiring a file corresponding to the received item of file information from the storage; and transmitting the acquired file to a print server that performs printing processing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, users of mobile devices desire to print out files on the cloud storage in some cases. For these cases, a conceivable method is to print a file after downloading the file stored in the cloud storage to the mobile device and in turn uploading the file to a print server that performs printing processing. However, when this method is employed, communication load at the time of downloading and uploading the file is additionally caused. In consideration of the case described above, it is desired to efficiently print files stored in the external storage outside the terminal in accordance with operations that are performed on the terminal.

Figure 1:
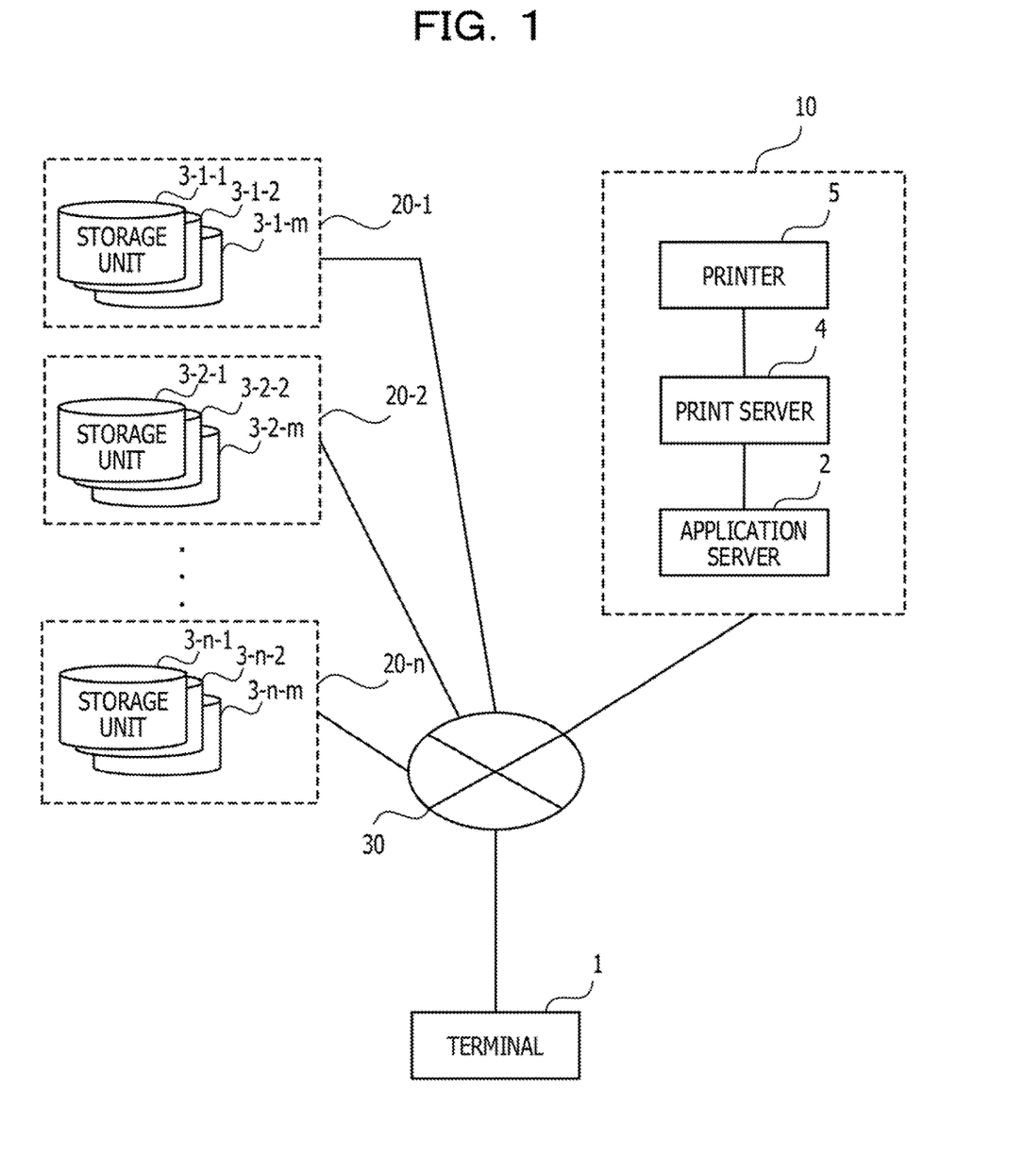
FIG. 1 illustrates an example of an overall configuration of a system according to an embodiment.

Hereinafter, an embodiment is described with reference to the drawings. FIG. 1 illustrates an example of an overall configuration of a system according to the embodiment. The system according to the embodiment is configured by coupling a terminal 1, an information processing system 10, and storage systems 20-1 to 20-n to each other via a network 30. The storage systems 20-1 to 20-n are each referred to as the storage system 20 when the storage systems 20-1 to 20-n are not distinguished from each other. The storage system 20 exists for each storage service. The storage system 20 may be applied to, for example, a cloud storage service usable by a plurality of users. The terminal 1 is, for example, a mobile device, such as a smartphone or a tablet terminal. The network 30 is, for example, a communication network, such as a wide area network (WAN) or a local area network (LAN).

The information processing system 10 includes an application server 2, a print server 4, and a printer 5. The apparatuses in the information processing system 10 are coupled to each other via a communication network such as a LAN.

The application server 2 has an application (for example, a bot) that enables transmission and reception of information to and from, for example, the terminal 1 by using a chat application. The application server 2 is an example of an apparatus for managing printing or a computer. The application server 2 may have the functionality of the print server 4; in this case, it is possible that the information processing system 10 does not include the print server 4.

The storage system 20-*n* includes a plurality of storage units 3-*n*-1, 3-*n*-2, . . . , and 3-*n*-*m*. Hereinafter, the storage units 3-*n*-1, 3-*n*-2, . . . , and 3-*n*-*m* are each referred to as the storage unit 3 when the storage units 3-*n*-1, 3-*n*-2, . . . , and 3-*n*-*m* are not distinguished from each other. The storage unit 3 exists for each user account of a user who uses the storage service.

When a file in the storage unit 3 is to be printed, the application server 2 receives the file from the storage unit 3 and in turn transmits the file to the print server 4. The print server 4 generates print data based on the received file and transmits the print data to the printer 5. The print data is, for example, portable document format (PDF) data or page-description language (PDL) data. When the received file is PDF data, the print server 4 may transmit the received file per se to the printer 5 without any change.

The printer 5 prints using the print data that has been transmitted. The printer 5 may be, for example, a multifunction device having a plurality of functionalities such as those of a printer, a facsimile, a scanner, and a copier.

Concerning the system illustrated in FIG. 1, it is possible to consider a plurality of methods as examples of a method for printing, by using a printer 5, a file stored in the storage unit 3 in accordance with an operation performed on the terminal 1. For example, it is considered to install in the terminal 1 a printing application having the function of printer driver and access the printer 5 from the terminal 1 to perform printing. This method, however, increases the user's workload for installing the printing application and also the management cost for managing whether the printing application is installed. This also increases the development cost for causing the printing application to be compatible with the operating system (OS) when the OS is upgraded.

When bring your own device (BYOD) is practiced, more specifically, when the terminal 1 is a terminal for an individual, a security risk may occur because files are stored in the terminal 1. When a file in the storage unit 3 is downloaded to the terminal 1 and in turn uploaded to the print server 4 in the information processing system 10 to print the file, the communication load at the time of downloading and uploading the file is additionally caused.

As another method, it is considered that the print server 4 obtains a file stored in a directory for printing that is present in a region other than the storage unit 3 of the storage system 20 in order to perform printing. In this case, the cost for managing and operating the directory for printing with respect to each user is additionally caused. The user performs an operation for transmitting a file in the storage unit 3 to the directory for printing, resulting in the increase in the user's workload.

Figure 2:
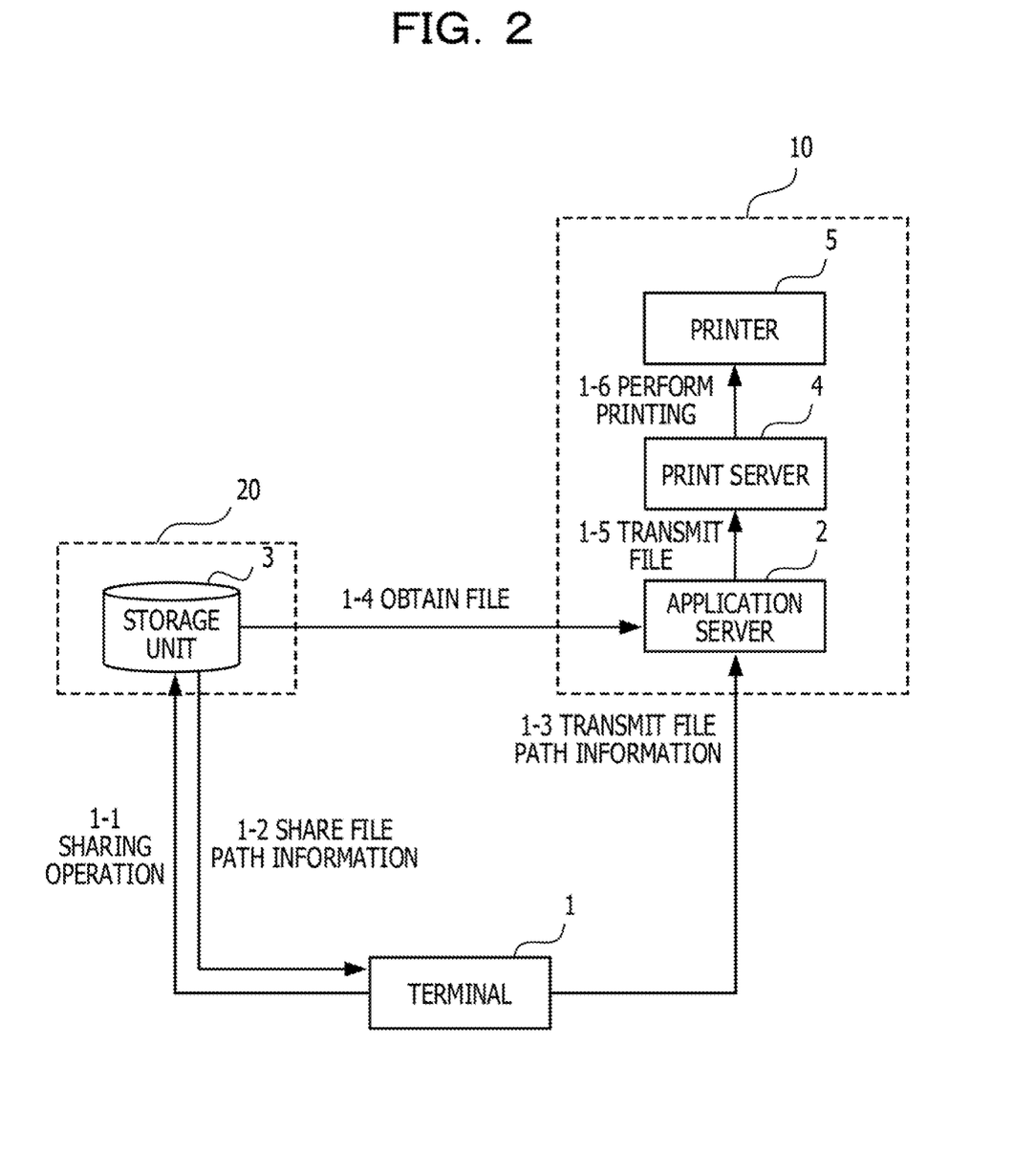
FIG. 2 illustrates steps in a method in which an application server shares a file with a storage unit so that printing is performed.

FIG. 2 illustrates steps in a method in which the application server 2 shares a file with the storage unit 3 so that printing is performed. A system in FIG. 2 is illustrated while the illustration of the network 30 in FIG. 1 is omitted. Among the plurality of storage systems 20 and the plurality of storage units 3, ones other than the storage system 20 and the storage unit 3 used by the terminal 1 are omitted in the drawing.

The terminal 1 accesses the storage unit 3 in accordance with a user's operation and performs an operation to cause the storage unit 3 to share a file in the storage unit 3 with the chat application (1-1). By this operation, file path information is shared with the chat application installed in the terminal 1 (1-2). The terminal 1 transmits the file path information to the application server 2 by using the chat application (1-3). The application server 2 obtains the file from the storage unit 3 by using the file path information (1-4).

The application server 2 transmits the file obtained from the storage unit 3 together with a print instruction to the print server 4 (1-5). The print server 4 generates print data based on the file and transmits the print data to the printer 5 (1-6). The printer 5 prints using the print data that has been transmitted.

In the example illustrated in FIG. 2, when the terminal 1 obtains the file path information, the user performs the operation to share the file by using an application for the storage service and then performs another operation to switch the application to the chat application. Thus, additional tasks are caused to operate the two applications.

Furthermore, in the example illustrated in FIG. 2, in the case in which a plurality of accounts exist, the user may perform an additional task to switch accounts at the time of performing the sharing operation. The plurality of accounts include, for example, an account that is used commonly in a department and an account for an individual. When an account used with the application for the storage service utilized at the time of performing the sharing operation is different from an account used with the chat application, management issues may occur.

In the example illustrated in FIG. 2, performing the sharing operation with the application for the storage service triggers printing, and as a result, it is difficult for the user to recognize the operation for performing printing. The file path information is, for example, a uniform resource locator (URL) that indicates an address for a particular file on a storage service, which is different from file name. Thus, when the user transmits the file path information by using the chat application, the user switches the application to the application for the storage service to check the file name, and thus, the user's workload is increased.

As described above, when the method illustrated in FIG. 2 is employed, although it is possible to print a file stored in the storage unit 3 in accordance with the operation performed on the terminal 1, there is a problem in which the usability is not desirable.

Figure 3:
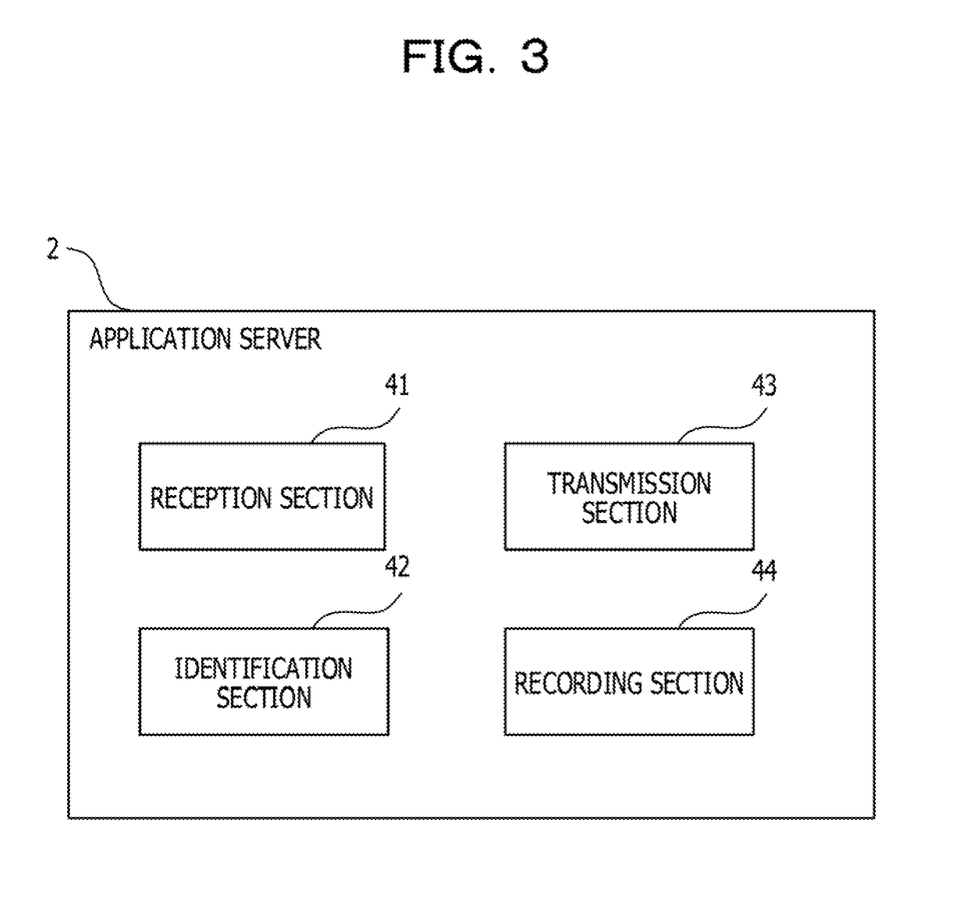
FIG. 3 illustrates an example of a functional configuration of the application server.

FIG. 3 illustrates an example of a functional configuration of the application server 2. The application server 2 includes a reception section 41, an identification section 42, a transmission section 43, and a recording section 44. The function of the application server 2 is implemented as, for example, a bot capable of transmitting and receiving information to and from the terminal 1 by using the chat application. A first identifier in the following description denotes an identifier indicating a particular storage unit 3 and is, for example, a user account. A second identifier denotes an identifier indicating a particular printer 5, which and is, for example, a name of the particular printer 5. A third identifier denotes an identifier indicating a particular storage system 20 and is, for example, a name of a storage service that provides the particular storage system 20.

The reception section 41 receives from the terminal 1 a print request and the first identifier that has been input by a user when the user utilizes the chat application on the terminal 1. The reception section 41 may also receive from the terminal 1 the third identifier indicating the storage system 20 storing a file targeted for printing.

The identification section 42 identifies, in accordance with the received first identifier, the storage unit 3 associated with the first identifier. For example, the identification section 42 identifies the storage system 20 in accordance with the third identifier and accesses the storage system 20.

The identification section 42 then identifies the storage unit 3 associated with the first identifier among the storage units 3 included in the storage system 20.

Since the identification section 42 identifies the storage system 20 in accordance with the third identifier, when the user utilizes multiple storage services, it is possible to easily identify the storage unit 3 storing a file targeted for printing.

The transmission section 43 transmits to the identified storage unit 3 a request to obtain part or all of the file information stored in the storage unit 3. Hereinafter, part or all of the file information stored in the storage unit 3 is simply referred to as file information. The file information includes, for example, a file name, a file path, a file identifier, and a URL at which a corresponding file is stored. The file information may include, for example, a folder name of a folder in which a corresponding file is stored.

The transmission section 43 transmits to the terminal 1 a list of file information transmitted from the storage unit 3 in response to the request submitted to obtain the file information. The transmission section 43 transmits, by using, for example, the chat application, to the terminal 1 a preset form, in which the list of file information is presented and the file information is selectable, as a message in the chat application. Hereinafter, this message is referred to as a form message. The form message will be described in detail later.

The reception section 41 receives, by using the chat application, an item of file information selected from the list of file information via the terminal 1. The reception section 41 obtains (receives) from the storage unit 3 a file corresponding to the received item of file information.

The transmission section 43 transmits the obtained file and an instruction for printing the file to the print server 4 that performs printing processing.

The recording section 44 stores various kinds of data that are used for processing performed by the application server 2. The recording section 44 stores, for example, the list of file Information and a file that are obtained from the storage unit 3, and the identifiers that are received from the terminal 1.

The reception section 41 is an example of a first reception unit, a second reception unit, and an acquisition unit. The transmission section 43 is an example of a first transmission unit, a second transmission unit, and a third transmission unit.

The application server 2 may include the function of the print server 4. When the application server 2 having the function of the print server 4 receives a print instruction from the printer 5, the application server 2 generates print data based on a file obtained from the storage unit 3 and transmits the generated print data to the printer 5. When the application server 2 having the function of the print server 4 receives from the terminal 1 the second identifier indicating the printer 5, the application server 2 may generate print data based on a file obtained from the storage unit 3 and transmit the generated print data to the printer 5 indicated by the second identifier.

Figure 4:
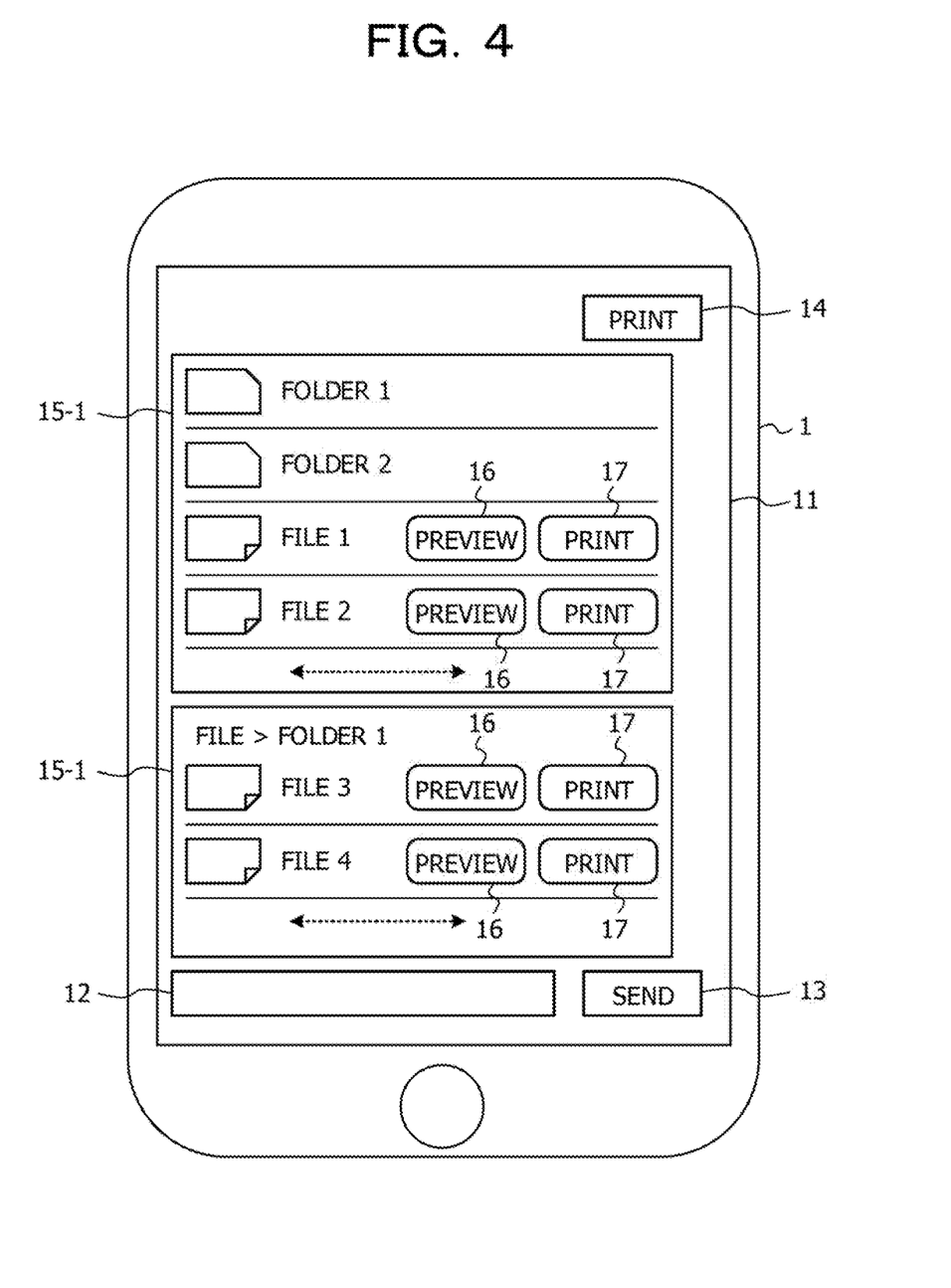
FIG. 4 illustrates an example of a screen display of a terminal.

FIG. 4 illustrates an example of a screen display of the terminal 1. FIG. 4 illustrates the state in which details of chat with the chat application are displayed on a screen 11 of the terminal 1. The screen 11 include a message input box 12 and a send button 13 for the chat application. For example, by user's operation, a message is input in the message input box 12 and then the send button 13 is pressed, and as a result, the input message is sent to a chat partner.

A message 14 is a message representing a print request transmitted from the terminal 1 to the application server 2. For example, as indicated by the message 14, when the terminal 1 transmits a message "printing", the application server 2 receives the message as a print request. The recording section 44 of the application server 2 stores in advance, for example, multiple kinds of messages that are all regarded as print requests. The messages regarded as print requests include, for example, "print", "print out", "make prints", and "printing".

In response to the print request submitted from the terminal 1, it is assumed that the transmission section 43 of the application server 2 transmits a form message 15-1 as a message in the chat application to the terminal 1. The form message 15-1 indicates a list of file information stored in the storage unit 3 and is an input form in which file information is selectable. In the example illustrated in FIG. 4, file names and folder names are listed and displayed in the form message 15-1. A preview button 16 and a print button 17 are displayed at positions adjacent to each file name. When the preview button 16 is tapped, the terminal 1 displays a print preview of the corresponding file or the content of the file stored in the storage unit 3. When the print button 17 is tapped, the terminal 1 transmits to the application server 2 the file information (for example, file path information, a file identifier, or a URL at which a corresponding file is stored) corresponding to the print button 17. The terminal 1 may, after the print button 17 is tapped, display a screen for setting printing properties; and after the printing properties are set, the terminal 1 may transmit a corresponding file name together with information of the printing properties to the application server 2.

When a folder name is tapped in the form message 15-1, the terminal 1 displays a list of files stored in the folder. In the example illustrated in FIG. 4, a form message 15-2 indicating a list of file names of files in the folder 1 is displayed after a folder 1 in the form message 15-1 is tapped. The functions of the preview button 16 and the print button 17 in the form message 15-2 are identical to those of the preview button 16 and the print button 17 in the form message 15-1.

The form message is a user interface (UI) in a form not depending on any particular chat application. Thus, developers are not required to develop UIs for different chat applications, so that it is possible to reduce the workload of developers. Since the user is able to select a file targeted for printing by using a form, it is possible to decrease the possibility of input errors in comparison to the case in which a file name or the like is designated by inputting text.

For example, it is considered to display a web page indicating the list of file information by using a web browser in the terminal 1. However, the user is required to perform operations to switch between the chat application and the web browser, and thus, user's workload is increased. In addition, developers are required to develop web pages of sizes appropriate for different types of the terminal 1 and also develop a method for sending user's authentication information from the chat application to the web browser, and as a result, developers' workload is also increased.

It is also considered to create UIs that are customized for different chat applications and indicate the list of file information and to display the UIs by using the terminal 1. This, however, increases developers' workload to develop the UIs.

Figure 5:
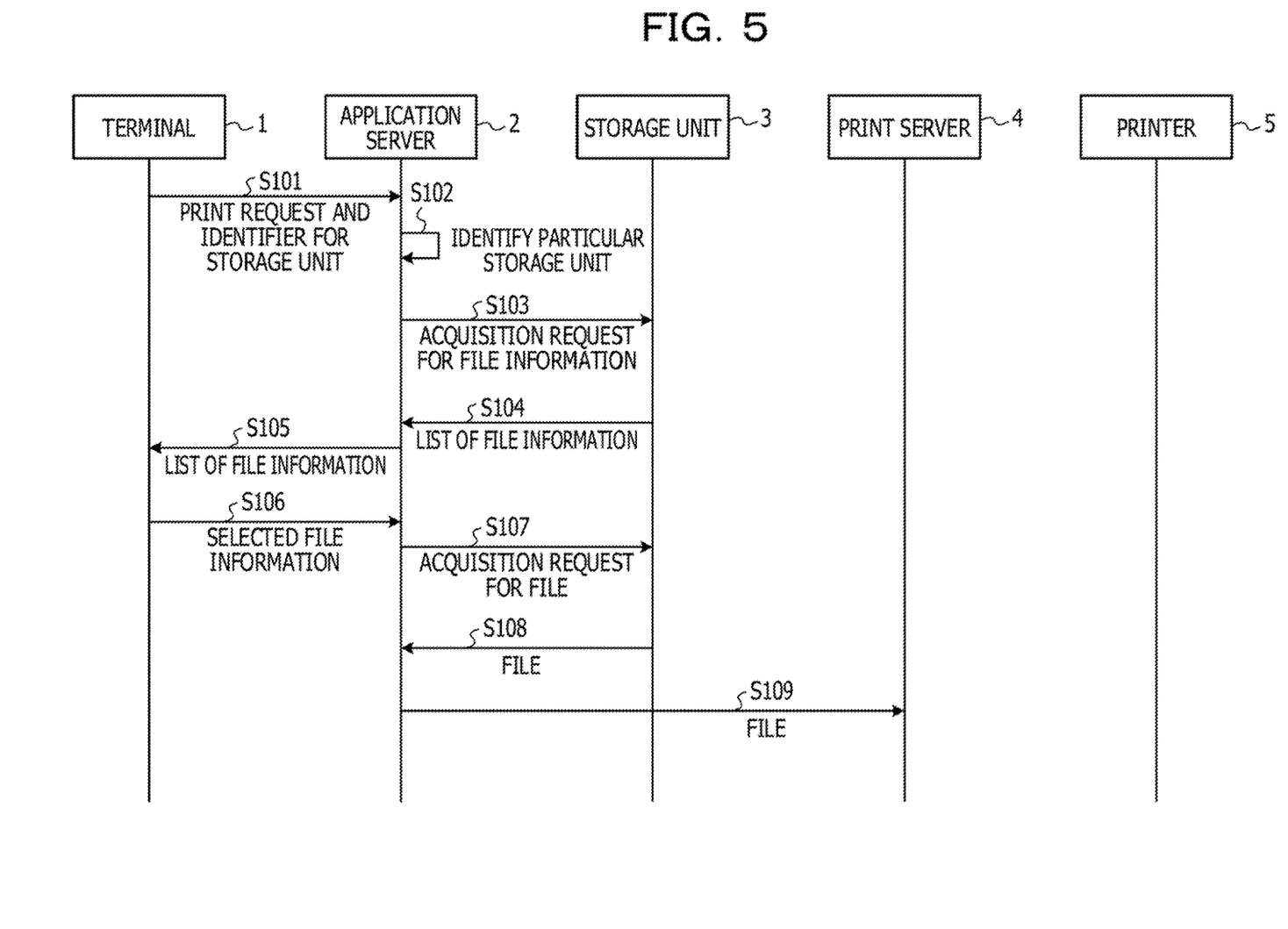
FIG. 5 is a sequence diagram (part 1) illustrating a first example of processing according to the embodiment.
Figure 6:
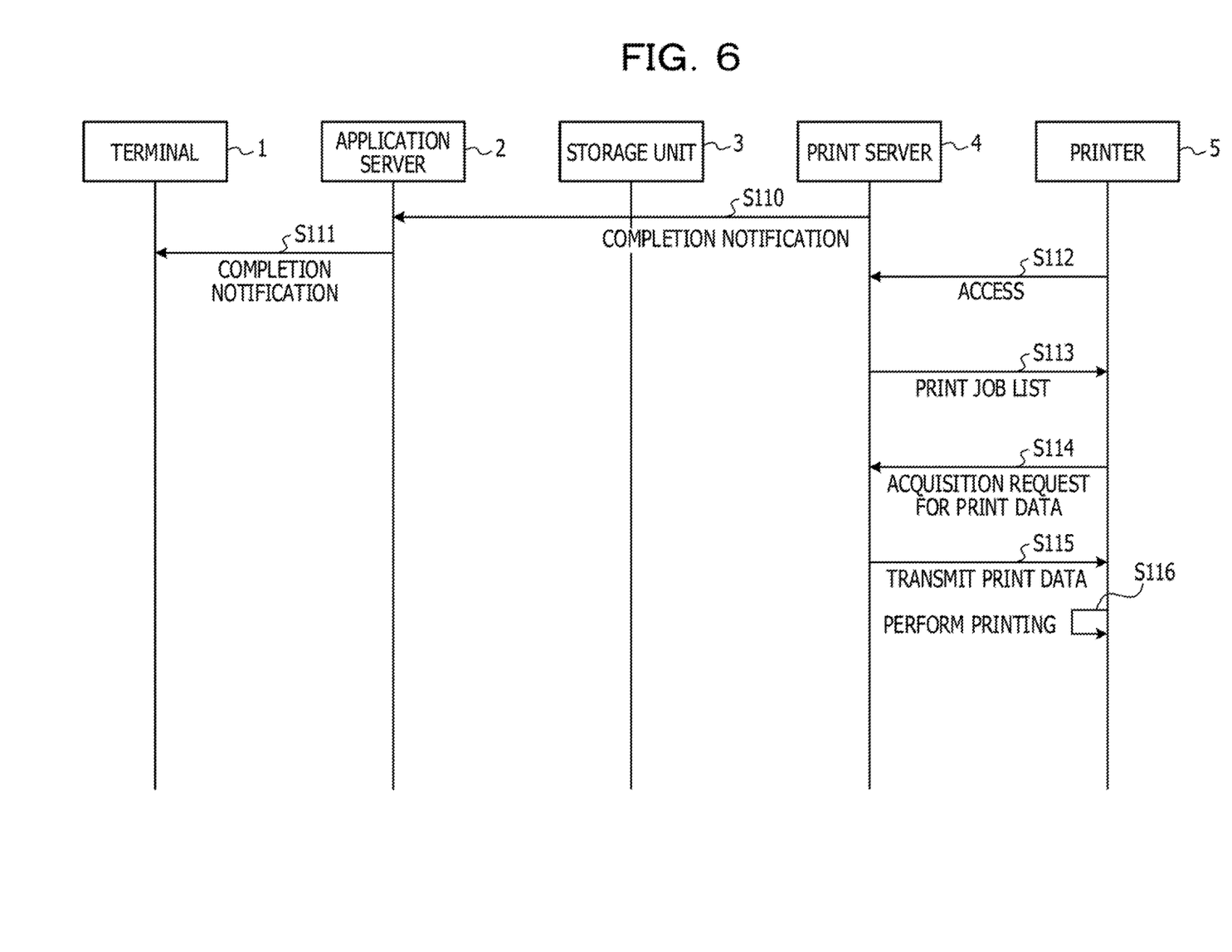
FIG. 6 is another sequence diagram (part 2) illustrating the first example of processing according to the embodiment.

FIGS. 5 and 6 are sequence diagrams together illustrating a first example of processing according to the embodiment. The reception section 41 of the application server 2 receives from the terminal 1 a print request and the first identifier (an identifier of the storage unit 3) that has been input when the user utilizes the chat application on the terminal 1 (step S101). The identification section 42 of the application server 2 identifies, in accordance with the received first identifier, the storage unit 3 associated with the first identifier (steps S102).

The transmission section 43 of the application server 2 transmits to the identified storage unit 3 a request to obtain the file information stored in the storage unit 3 (step S103). The reception section 41 receives from the storage unit 3 a list of file information stored in the storage unit 3 (step S104). The transmission section 43 transmits to the terminal 1 the list of file information received from the storage unit 3 (step S105).

The reception section 41 receives, by using the chat application, from the terminal 1 a particular item of file information selected from the list of file information and printing properties (step S106). The printing properties include, for example, a time and date when the terminal 1 submits a corresponding print request, a page number, and the number of copies. The transmission section 43 transmits to the storage unit 3 a request to obtain the selected file (step S107). The reception section 41 obtains from the storage unit 3 a file corresponding to the received file information (step S108). The transmission section 43 transmits the obtained file and the printing properties to the print server 4 that performs printing processing (step S109).

In FIG. 6, the print server 4 registers the obtained file and the printing properties as a print job and transmits to the application server 2 a completion notification indicating that the registration of the print job is completed (step S110). The application server 2 in turn transmits by using the chat application to the terminal 1 a completion notification indicating that the registration of the print job is completed (step S111).

When the printer 5 receives a login operation performed by a user, the printer 5 accesses the print server 4 (step S112). The print server 4 transmits to the printer 5 a list of print jobs regarding the received print data (step S113). The printer 5 displays the list of print jobs at a display unit (for example, a touch panel display) of the printer 5; when the printer 5 receives an operation performed by the user to select a particular print job targeted for printing, the printer 5 transmits to the print server 4 a request to obtain print data corresponding to the particular print job (step S114). The user selects a particular print job by, for example, touching a display area corresponding to the particular print job displayed at the display unit of the printer 5. The request from the printer 5 to obtain print data is an example of a print instruction. In response to the request to obtain print data, the print server 4 generates print data based on the file obtained from the storage unit 3 and transmits the print data to the printer 5 (step S115). The printer 5 prints by using the transmitted print data (step S116).

Figure 7:
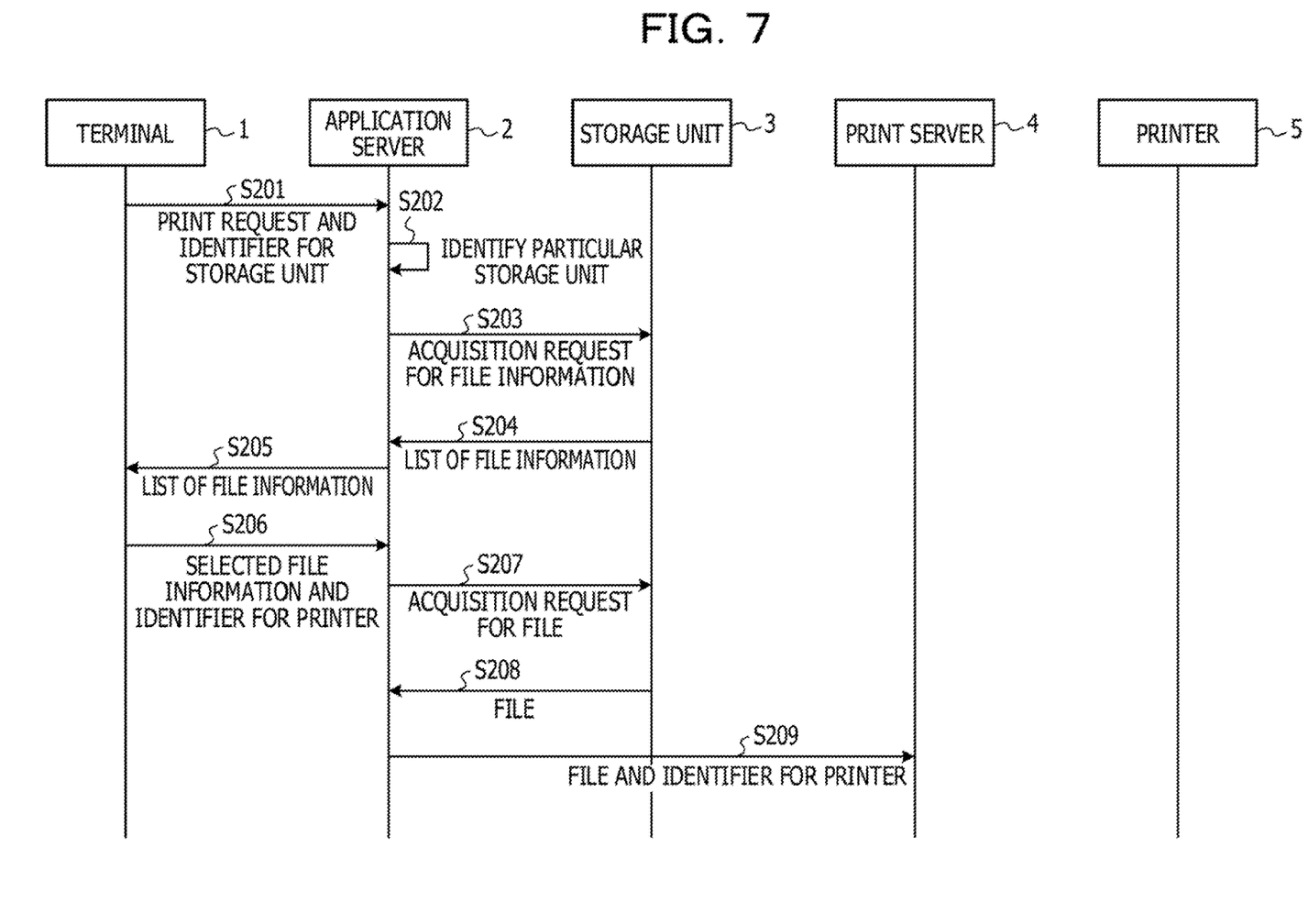
FIG. 7 is a sequence diagram (part 1) illustrating a second example of processing according to the embodiment.
Figure 8:
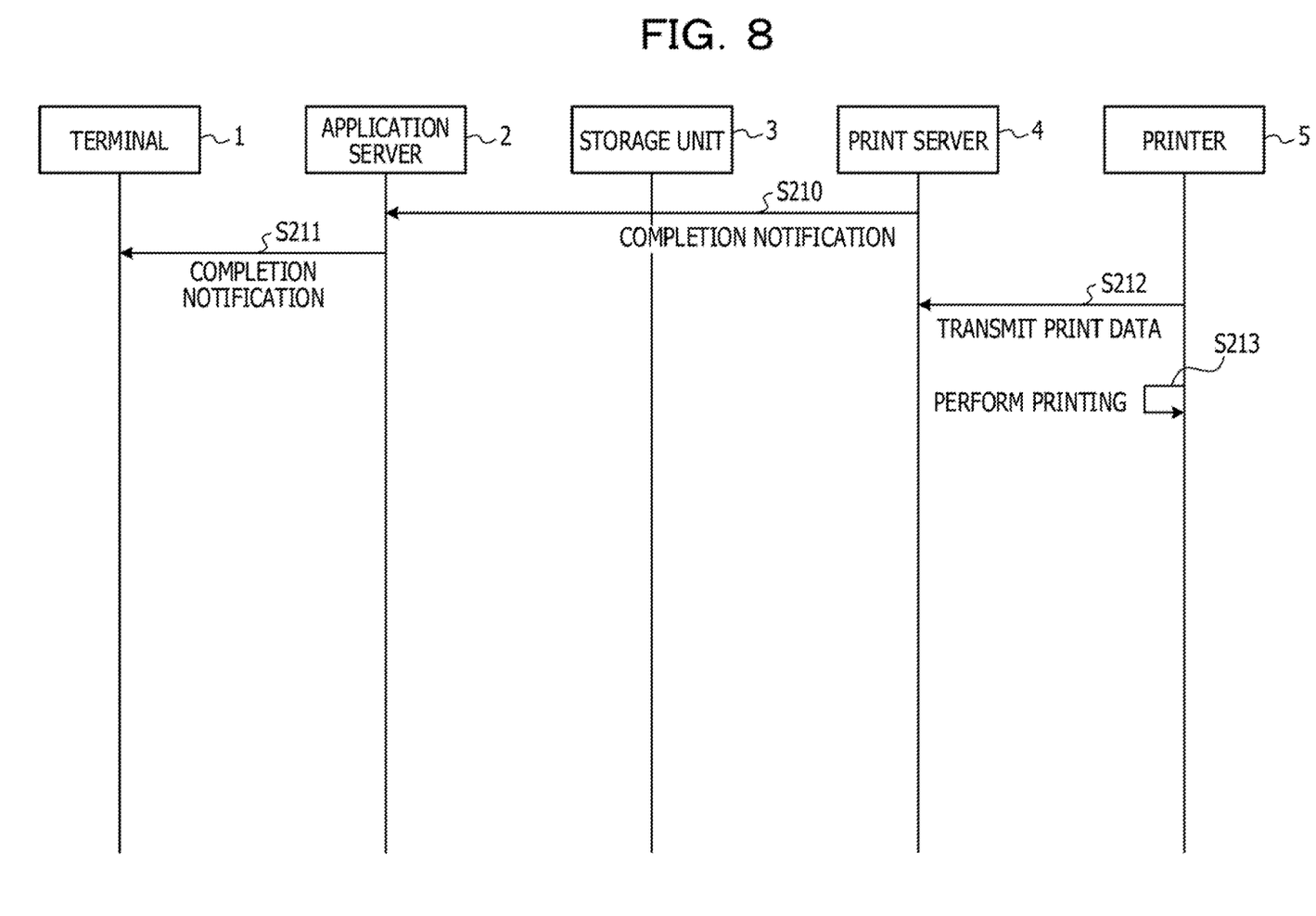
FIG. 8 is another sequence diagram (part 2) Illustrating the second example of processing according to the embodiment.

FIGS. 7 and 8 are sequence diagrams together illustrating a second example of processing according to the embodiment. Steps S201 to S205, S207, and S208 in FIG. 7 are identical to steps S101 to S105, S107, and S108 in FIG. 5 and the description thereof is thus omitted.

In the example illustrated in FIG. 7, the reception section 41 receives from the terminal 1 the second identifier indicating the printer 5 that is to be caused to perform printing, together with an item of file information selected from the list of file information and the printing properties by using the chat application (step S206).

The transmission section 43 transmits to the print server 4, which performs printing processing, the second identifier indicating the printer 5 that is to be caused to perform printing, together with the file obtained from the storage unit 3 and the printing properties (step S209).

In FIG. 8, the print server 4 registers the obtained file and the printing properties as a print job and transmits to the application server 2 a completion notification indicating that the registration of the print job is completed (step S210). The application server 2 in turn transmits by using the chat application to the terminal 1 a completion notification indicating that the registration of the print job is completed (step S211).

The print server 4 generates print data based on the file received from the storage unit 3 and transmits the print data to the printer 5 indicated by the transmitted second identifier (step S212). The printer 5 prints by using the transmitted print data (step S213).

As described above, the application server 2 according to the embodiment transmits and receives messages to and from the terminal 1 by using the chat application and transmits to the print server 4, in accordance with an instruction provided by the terminal 1, a file obtained from the storage unit 3. With this configuration, it is possible to print a print target file without downloading the file by using the terminal 1, the communication load may be reduced in comparison to the case in which the terminal 1 downloads the file. Furthermore, since the file is not stored in the terminal 1, it is possible to reduce security risks.

Moreover, since the terminal 1 is able to provide a print instruction by using not the application of the storage service but the chat application, the usability may be improved.

Figure 9:
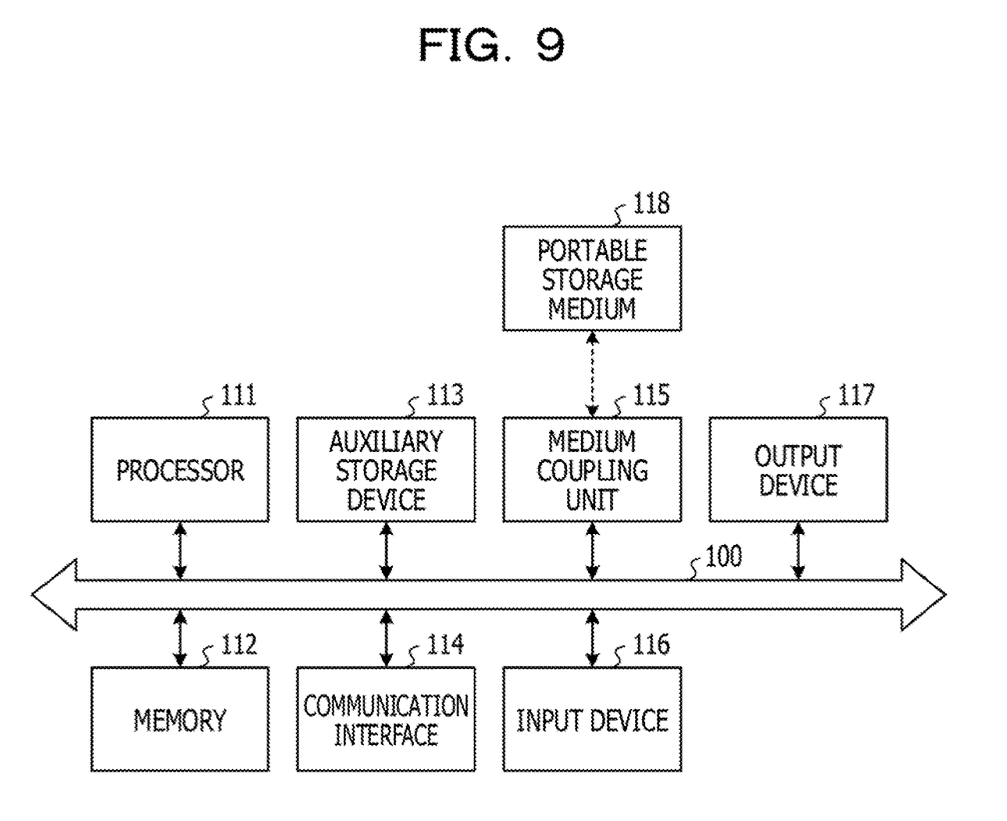
FIG. 9 illustrates an example of a hardware configuration of the application server.

Next, an example of a hardware configuration of the application server 2 is described. FIG. 9 illustrates an example of a hardware configuration of the application server 2. As illustrated in the example in FIG. 9, in the application server 2, a processor 111, a memory 112, an auxiliary storage device 113, a communication interface 114, a medium coupling unit 115, an input device 116, and an output device 117 are coupled to a bus 100.

The processor 111 runs a program loaded in the memory 112. As the program that is run by the processor 111, a print management program for performing processing according to the embodiment may be applied.

The memory 112 is, for example, a random-access memory (RAM). The auxiliary storage device 113 is a storage device that stores various kinds of information. As the auxiliary storage device 113, for example, a hard disk drive or a semiconductor memory may be applied. The auxiliary storage device 113 may store the print management program for performing processing according to the embodiment.

The communication interface 114 is coupled to a communication network such as a LAN or a WAN and performs, for example, data conversion for communication.

The medium coupling unit 115 is an interface to which a portable storage medium 118 is able to be coupled. As the portable storage medium 118, for example, an optical disc (for example, a compact disc (CD) or a digital versatile disc (DVD)) or a semiconductor memory may be applied. The portable storage medium 118 may store the print management program for performing processing according to the embodiment.

The input device 116 is, for example, a keyboard, a pointing device, or both and receives inputs from users such as instructions and information. The output device 117 is, for example, a display device, a speaker, or both and outputs, for example, inquiries and instructions for users and processing results.

The recording section 44 illustrated in FIG. 3 may be implemented as, for example, the memory 112, the auxiliary storage device 113, or the portable storage medium 118. The reception section 41, the identification section 42, and the transmission section 43, which are illustrated in FIG. 3, may be implemented by the processor 111 running the print management program loaded in the memory 112.

The memory 112, the auxiliary storage device 113, and the portable storage medium 118 are all computer-readable non-transitory tangible storage media and not temporal media such as signal carrier waves.

It is possible that the application server 2 does not include all components illustrated in FIG. 9 and one or more of the components may be omitted. One or more of the components may be present in an external device outside the application server 2 and the application server 2 may utilize the components in the external device by accessing the external device. It is assumed that the hardware configuration of the terminal 1 and the hardware configuration of the print server 4 are the same as the configuration illustrated in FIG. 9.

The embodiment is not limited to the examples described above and various modifications, additions, and exclusions may be made without departing from the scope of the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    receiving, from a terminal, a print request and a first identifier that is input when an application is used on the terminal;
    identifying, in accordance with the received first identifier, a storage that is associated with the first identifier and that stores file information;
    transmitting to the identified storage an acquisition request to acquire part or all of the file information stored in the storage;
    transmitting to the terminal a list of the part or all of the file information transmitted from the storage in response to the acquisition request;
    receiving, from the terminal on which the application is used, a print attribute and an item of file information selected from the list of the part or all of the file information, the print attribute including a time of when the terminal submits a corresponding print request;
    acquiring a file corresponding to the received item of file information from the storage; and
    transmitting the received print attribute and the acquired file to a print server that performs printing processing, wherein
    the print request is a certain message in a chat application executed in the terminal.

2. The non-transitory computer-readable storage medium according to claim 1, where
    a third identifier indicating a storage system is received from the terminal, and
    the storage system is identified in accordance with the third identifier, the identified storage system is accessed, and the storage associated with the first identifier is identified among a plurality of storages included in the storage system.

3. The non-transitory computer-readable storage medium according to claim 1, wherein
    a form in which the list of the part or all of the file information is presented and the item of file information is selectable is transmitted to the terminal as a message in the application.

4. A non-transitory computer-readable storage medium storing a program that causes a computer to execute a process, the process comprising:
    receiving, from a terminal, a print request and a first identifier that is input when an application is used on the terminal;
    identifying, in accordance with the received first identifier, a storage that is associated with the first identifier and that stores file information;
    transmitting to the identified storage an acquisition request to acquire part or all of the file information stored in the storage;
    transmitting to the terminal a list of the part or all of the file information transmitted from the storage in response to the acquisition request;
    receiving, from the terminal on which the application is used, a print attribute and an item of file information selected from the list of the part or all of the file information, the print attribute including a time of when the terminal submits a corresponding print request;
    acquiring a file corresponding to the received item of file information from the storage; and
    when a print instruction is received from a printer, transmitting print data based on the acquired file to the printer, wherein
    the print request is a certain message in a chat application executed in the terminal.

5. A method for managing printing, the method being implemented by a computer, the method comprising:
    receiving, from a terminal, a print request and a first identifier that is input when an application is used on the terminal;
    identifying, in accordance with the received first identifier, a storage that is associated with the first identifier and that stores file information;
    transmitting to the identified storage an acquisition request to acquire part or all of the file information stored in the storage;
    transmitting to the terminal a list of the part or all of the file information transmitted from the storage in response to the acquisition request;
    receiving, from the terminal on which the application is used, a print attribute and an item of file information selected from the list of the part or all of the file information, the print attribute including a time when the terminal submits a corresponding print request;
    acquiring a file corresponding to the received item of file information from the storage; and
    transmitting the received print attribute and the acquired file to a print server that performs printing processing, wherein the print request is a certain message in a chat application executed in the terminal.

6. A method for managing printing, the method being implemented by a computer, the method comprising:

receiving, from a terminal, a print request and a first identifier that is input when an application is used on the terminal;

identifying, in accordance with the received first identifier, a storage that is associated with the first identifier and that stores file information;

transmitting to the identified storage an acquisition request to acquire part or all of the file information stored in the storage;

transmitting to the terminal a list of the part or all of the file information transmitted from the storage in response to the acquisition request;

receiving, from the terminal on which the application is used, a print attribute and an item of file information selected from the list of the part or all of the file information, the print attribute including a time when the terminal submits a corresponding print request;

acquiring a file corresponding to the received item of file information from the storage; and when a print instruction is received from a printer, transmitting print data based on the acquired file to the printer, wherein the print request is a certain message in a chat application executed in the terminal.

7. An apparatus for managing printing, comprising:

a memory; and a processor coupled to the memory and the processor configured to:

receive, from a terminal, a print request and a first identifier that is input when an application is used on the terminal, identify, in accordance with the received first identifier, a storage that is associated with the first identifier and that stores file information, transmit to the identified storage an acquisition request to acquire part or all of the file information stored in the storage, transmit to the terminal a list of the part or all of the file information transmitted from the storage in response to the acquisition request;

receive, from the terminal on which the application is used, a print attribute and an item of file information selected from the list of the part or all of the file information, the print attribute including a time when the terminal submits a corresponding print request, acquire a file corresponding to the received item of file information from the storage, and transmit the received print attribute and the acquired file to a print server that performs printing processing, wherein the print request is a certain message in a chat application executed in the terminal.

8. An apparatus for managing printing, comprising:

a memory; and a processor coupled to the memory and the processor configured to:

receive, from a terminal, a print request and a first identifier that is input when an application is used on the terminal, identify, in accordance with the received first identifier, a storage that is associated with the first identifier and that stores file information;

transmit to the identified storage an acquisition request to acquire part or all of the file information stored in the storage, transmit to the terminal a list of the part or all of the file information transmitted from the storage in response to the acquisition request;

receive, from the terminal on which the application is used, a print attribute and an item of file information selected from the list of the part or all of the file information, the print attribute including a time when the terminal submits a corresponding print request, acquire a file corresponding to the received item of file information from the storage, and transmit print data based on the acquired file to the printer when a print instruction is received from a printer, wherein the print request is a certain message in a chat application executed in the terminal.

* * * * *